(12) United States Patent
Raikhman et al.

(10) Patent No.: US 12,416,174 B2
(45) Date of Patent: Sep. 16, 2025

(54) WIRELESS BASED PICK-UP AND IN POOL NAVIGATION

(71) Applicant: Maytronics Ltd., Kibbutz Yizrael (IL)

(72) Inventors: Vladimir Raikhman, Nesher (IL); Malka Klein-Frucht, Yuvalim (IL)

(73) Assignee: Maytronics Ltd., Kibbutz Yizrael (IL)

( * ) Notice: Subject to any disclaimer, the term of this patent is extended or adjusted under 35 U.S.C. 154(b) by 0 days.

(21) Appl. No.: 18/829,597

(22) Filed: Sep. 10, 2024

(65) Prior Publication Data
US 2025/0092706 A1    Mar. 20, 2025

(30) Foreign Application Priority Data

Sep. 20, 2023 (IL) .......................................... 306133

(51) Int. Cl.
| | | |
|---|---|---|
| *E04H 4/16* | (2006.01) | |
| *G05D 1/648* | (2024.01) | |
| *H04B 17/318* | (2015.01) | |
| *G05D 105/10* | (2024.01) | |
| *G05D 107/00* | (2024.01) | |
| *G05D 109/30* | (2024.01) | |
| *G05D 111/30* | (2024.01) | |

(52) U.S. Cl.
CPC ........... *E04H 4/1654* (2013.01); *G05D 1/648* (2024.01); *H04B 17/318* (2015.01); *G05D 2105/10* (2024.01); *G05D 2107/29* (2024.01); *G05D 2109/38* (2024.01); *G05D 2111/30* (2024.01)

(58) Field of Classification Search
None
See application file for complete search history.

(56) References Cited

U.S. PATENT DOCUMENTS

| | | |
|---|---|---|
| 11,753,840 B1 | 9/2023 | Zhong et al. |
| 2018/0073266 A1* | 3/2018 | Goldenberg ............. G05D 1/10 |
| 2018/0081333 A1 | 3/2018 | Michelon |
| 2018/0098676 A1 | 4/2018 | Ryu et al. |

(Continued)

FOREIGN PATENT DOCUMENTS

| | | |
|---|---|---|
| EP | 3303733 | 12/2020 |
| WO | WO 2022/099756 | 5/2022 |

OTHER PUBLICATIONS

Interview Summary Dated May 29, 2024 from the Israel Patent Office Re. Application No. 306133 (2 pages).

(Continued)

*Primary Examiner* — Tamara L Weber

(57) ABSTRACT

A system for navigating a dynamic pool equipment unit is disclosed. The system comprises a wireless unit physically connected to the dynamic pool equipment unit deployed in a water pool, allowing the wireless unit to move with the equipment while partially out of the water. The wireless unit includes a first interface for communicating with the equipment unit via a first communication channel, and a second interface for intercepting wireless signals from external stations via a wireless communication channel. A controller navigates the equipment unit towards the external station(s) by measuring the received signal strength indicator (RSSI) of intercepted wireless signals, estimating the direction of the external station(s) based on RSSI analysis, and transmitting movement instructions to the equipment unit to advance in the estimated direction.

20 Claims, 4 Drawing Sheets

(56) References Cited

U.S. PATENT DOCUMENTS

2022/0268045 A1* 8/2022 Lancry ................. E04H 4/1654
2023/0021697 A1* 1/2023 Abramson ............. G01S 11/06

OTHER PUBLICATIONS

Notice of Allowance Dated Jun. 10, 2024 From the Israel Patent Office Re. Application No. 306133. (5 Pages).
Search Strategy Report Dated Jun. 4, 2024 From the Israel Patent Office Re. Application No. 306133. (2 Pages).

* cited by examiner

WIRELESS BASED PICK-UP AND IN POOL NAVIGATION

RELATED APPLICATION(S)

This application claims the benefit of priority of Israel Patent Application No. 306133 filed on Sep. 20, 2023, the contents of which are incorporated by reference as if fully set forth herein in their entirety.

BACKGROUND

The present invention, in some embodiments thereof, relates to operating dynamic pool equipment to advance towards external stations outside water pools, and, more specifically, but not exclusively, to estimating direction of external stations located outside water pools based on analysis of their wireless signals and navigating operating dynamic pool equipment to advance (move) towards the estimated direction.

Automated pool equipment units, systems, platforms and/or devices in general, and dynamic pool equipment units in particular, for example, robots floating platforms such as skimmers, and/or the like have become extremely efficient, robust, and capable for a plurality of pool maintenance applications.

Such dynamic pool equipment units can be therefore seen in abundance in practically any type of artificial water bodies ranging from swimming and leisure pools, through water fountains to water reservoirs, and/or the like.

SUMMARY

According to a first aspect of the present invention there is provided a system for navigating a dynamic pool equipment unit, comprising a wireless unit physically connected to a dynamic pool equipment unit deployed in a water pool such that the wireless unit moves with the dynamic pool equipment unit while at least partially out of the water. The wireless unit comprising a first interface for communicating with the dynamic pool equipment unit via a first communication channel, a second interface for intercepting wireless signals transmitted by one or more external stations via a wireless communication channel, and a controller. The controller is adapted for navigating the dynamic pool equipment unit to advance towards the one or more external stations by measuring received signal strength indicator (RSSI) of wireless signals transmitted by the one or more external stations via the wireless communication channel and intercepted via the first interface, estimating a direction of the one or more external stations based on analysis of the RSSI, and transmitting movement instructions to the dynamic pool equipment unit to advance towards the estimated direction of the one or more external stations.

According to a second aspect of the present invention there is provided a method of navigating a dynamic pool equipment unit, comprising using a controller of a wireless unit physically connected to a dynamic pool equipment unit deployed in a water pool such that the wireless unit moves with the dynamic pool equipment unit while at least partially out of the water, for navigating the dynamic pool equipment unit to advance towards one or more external stations by measuring received signal strength indicator (RSSI) of wireless signals transmitted by the one or more external stations via the wireless communication channel and intercepted via a wireless communication channel, estimating a direction of the one or more external stations based on analysis of the RSSI, and transmitting movement instructions to the dynamic pool equipment unit, via a first communication channel, to advance towards the estimated direction of the one or more external stations.

According to a third aspect of the present invention there is provided a method of navigating a dynamic pool equipment unit, comprising using a controller of a wireless unit adapted to communicate with one or more dynamic pool equipment units deployed in a water pool, for measuring received signal strength indicator (RSSI) of wireless signals transmitted by one or more external stations via a second wireless communication channel, computing a location of the one or more external stations based on analysis of the RSSI, and transmitting to the one or more dynamic pool equipment unit, via a first communication channel, movement instructions to advance towards the location of the one or more external stations.

In a further implementation form of the first, second and/or third aspects, the controller is adapted to transmit the movement instructions to the dynamic pool equipment unit responsive to one or more of: receiving a retrieve command from the one or more external stations, and/or according to one or more predefined retrieval rules.

In a further implementation form of the first, second and/or third aspects, the wireless communication channel comprises one or more of: a Bluetooth based channel, a wireless local area network channel, and/or a radio frequency channel.

In a further implementation form of the first, second and/or third aspects, at least part of the second interface is out of water of the water pool.

In a further implementation form of the first, second and/or third aspects, the external stations are members of a group comprising: a client device associated with a user, a maintenance station, a charging station, and a master control unit.

In a further implementation form of the first, second and/or third aspects, the first communication channel comprises one or more of: a wired communication channel, and a first wireless communication channel.

In a further implementation form of the first, second and/or third aspects, the first wireless communication channel and the second wireless communication channel (designated wireless communication channel in the first and second aspects) are utilized by a single common wireless communication channel.

In a further implementation form of the first and/or second aspects, the controller is adapted to estimate the direction of the one or more external stations based on a power of the intercepted signals extracted from the RSSI.

In an optional implementation form of the first, and/or second aspects, the controller is adapted to navigate the dynamic pool equipment unit to advance towards the one or more external stations in a plurality of iterations. Each iteration comprising measuring the RSSI of wireless signals transmitted by the one or more external stations, estimating an updated direction of the one or more external stations based on analysis of the RSSI, and transmitting adjusted movement instructions to the dynamic pool equipment unit to advance towards the updated direction of the one or more external stations.

In a further implementation form of the first, and/or second aspects, the wireless unit is directly connected to the dynamic pool equipment unit.

In a further implementation form of the first, and/or second aspects, the wireless unit is connected to the dynamic pool equipment unit via one or more cables.

In a further implementation form of the third aspect, the controller is adapted to compute the location of the one or more external stations based on one or more location attributes of the one or more external stations computed based on the measured RSSI. The one or more location attributes are members of a group comprising: a distance, a direction, and an elevation.

In a further implementation form of the third aspect, the controller is further adapted to dynamically adjust the movement instructions responsive to a change in the location of the one or more external stations.

In a further implementation form of the third aspect, the movement instructions comprise instructions for operating the one or more dynamic pool equipment units to move according to a location of the one or more dynamic pool equipment units with respect to the location of the one or more external stations.

In a further implementation form of the third aspect, the movement instructions comprise the location of the one or more external stations to enable the one or more dynamic pool equipment units to advance towards the one or more external stations.

In a further implementation form of the third aspect, the controller is adapted to compute the location of the one or more dynamic pool equipment units based on location data received from one or more location sensors mechanically coupled to the respective dynamic pool equipment unit.

In a further implementation form of the third aspect, the controller is adapted to compute a location of the one or more dynamic pool equipment units based on analyses of wireless signals transmitted by the one or more dynamic pool equipment units via the first wireless communication channel.

In a further implementation form of the third aspect, the wireless unit is adapted for deployment in one or more of a plurality of deployment modes comprising, mechanical coupling to a buoy adapted for floating on a water surface of the water pool such that at least part of the wireless unit is out of water of the water pool, fixing in a static location in the water pool such that at least part of the wireless unit is out of water of the water pool, fixing in a static location outside the water pool, and/or mechanical coupling to another dynamic unit adapted for deployment in the water pool such that at least part of the wireless unit is out of water of the water pool.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
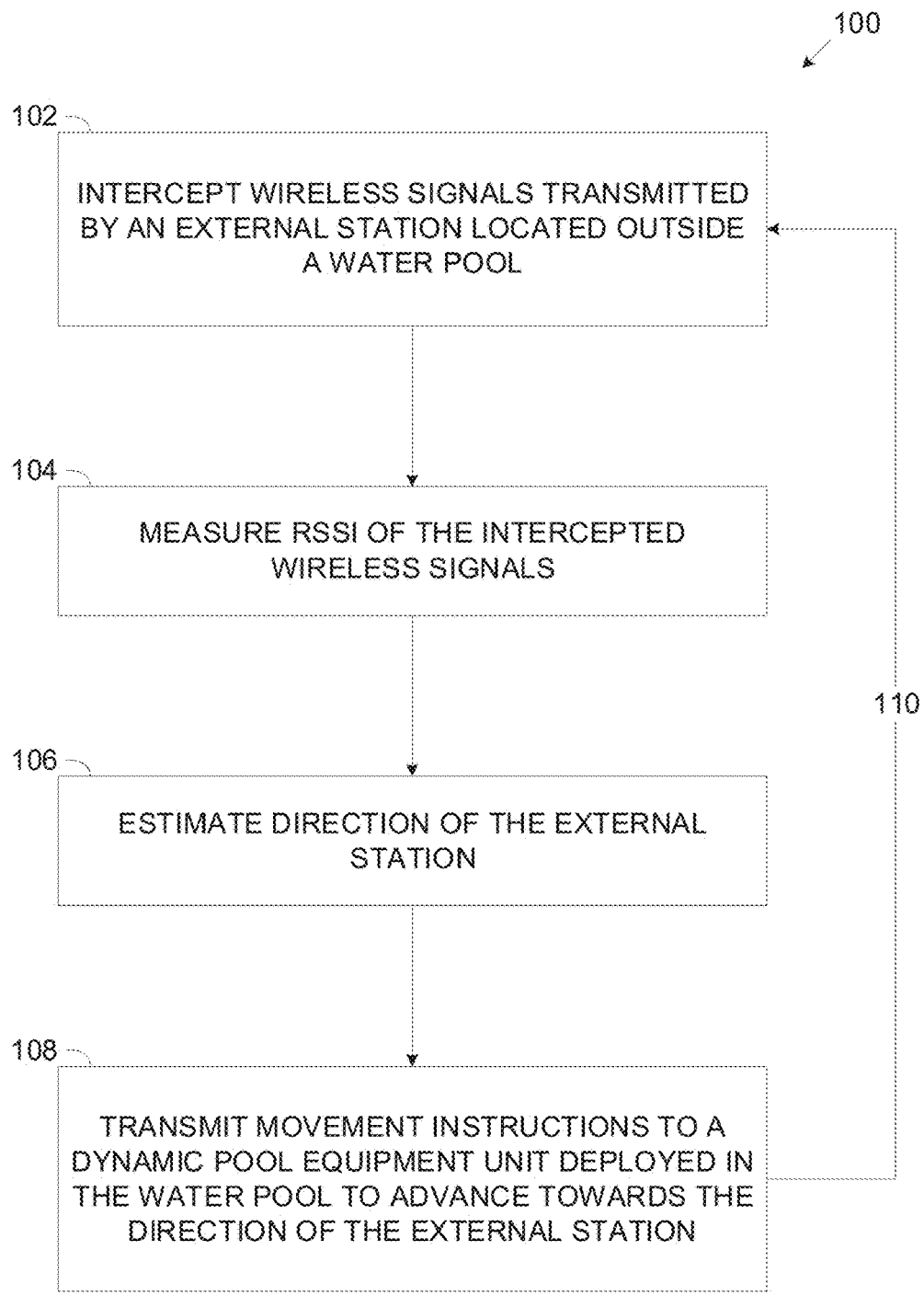
FIG. 1 is a flowchart of an exemplary process of operating a dynamic pool equipment unit to move towards an external station estimated based on analysis of intercepted wireless signals transmitted by the external station, according to some embodiments of the present invention.

The present invention, in some embodiments thereof, relates to operating dynamic pool equipment to advance towards external stations outside water pools, and, more specifically, but not exclusively, to estimating direction of external stations located outside water pools based on analysis of their wireless signals and operating dynamic pool equipment to advance (move) towards the estimated direction.

According to some embodiments of the present invention, there are provided methods, systems and computer program products for navigating dynamic pool equipment units, for example, robots, skimmers, mobile cleaning and/or maintenance equipment, and/or the like deployed in bodies of water to advance towards an external station located outside the water pool and reach it.

The bodies of water, in particular manmade (artificial) bodies of water may include, for example, a pool, a swimming pool, a fountain, a reservoir, and/or the like, and are collectively designated water pool herein after.

The external stations located outside the water pool may include, for example, a charging station, docking station, a maintenance station, a master control unit, and/or the like. In another example, the external stations may comprise one or more client devices, for example, remote control, a mobile device such as, for example, a phone, a Smartphone, a tablet, a laptop, a proprietary device, and/or the like which are associated with one or more users using the client device to pick-up, retrieve, and/or physically access the dynamic pool equipment unit.

In particular, the dynamic pool equipment unit may be operated to advance towards the external station by a wireless unit adapted to estimate, compute, and/or determine a direction and/or location of the external station based on analysis of intercepted wireless signals which are transmitted by the external station, via one or more wireless communication channels, for example, Bluetooth, Bluetooth Low Energy (BLE), Wireless Local Area Network (WLAN, e.g. Wi-Fi), Radio Frequency (RF) and/or the like.

Specifically, the wireless unit may estimate, compute, and/or determine the direction and/or location of the external station based on analysis of Received Signal Strength Indicator (RSSI) of the intercepted wireless signals originating from the external station.

According to some embodiments, the wireless unit may be connected to the dynamic pool equipment unit, for example, a pool robot, and/or the like via a cable such that the wireless unit, floating unit, may move with the dynamic pool equipment unit while at least partially out of the water of the water pool such that it may intercept the wireless signals transmitted by the external station(s). The wireless unit may communicate with the dynamic pool equipment unit via one or more one or more communication channels, typically wired channels routed through the connecting cable, for example, a serial channel, a Controller Area Network (CAN) bus channel, a proprietary communication channel, and/or the like.

In another example, the wireless unit may be mechanically coupled to the dynamic pool equipment unit, for example, a dynamic floating platform such as floating skimmer, and/or the like which may not completely submerge in the water of the water pool such that at least part of the wireless unit is out of the water. In such case, the wireless unit may communicate with the dynamic pool equipment unit via one or more communication channels, typically wired channels connecting the wireless unit to one or more controllers of the dynamic pool equipment unit adapted to control movement of the dynamic pool equipment unit.

In such embodiments, the wireless unit may analyze the RSSI of the intercepted wireless signals originating from the external station to identify, and/or determine strength of the intercepted signals, for example, power, energy level, and/or the like and estimate accordingly a direction of the external station.

Since the strength of the intercepted signals may increase as function of a distance of the wireless unit to the external station, the strength of the intercepted signals may increase when the wireless unit is closer to the external station, and vice versa, the strength of the intercepted signals may decrease when the wireless unit is further from the external station. Moreover, the strength of the intercepted signals may increase when one or more antenna elements of the wireless unit adapted the intercept the wireless signals incoming from the external station face the direction of the external station, specifically in case the antenna element(s) is directional.

The wireless unit may transmit movement instructions to the dynamic pool equipment unit, via the wired commination channel, to advance towards the estimated location of the external station.

Since it is physically connected to the dynamic pool equipment unit and moves with it in the same direction as the dynamic pool equipment unit moves, the wireless unit may transmit movement instructions to the dynamic pool equipment unit to operate it to advance towards the external station according to an increase in the RSSI. In particular, the wireless unit may transmit movement instructions, for example, move forward, move backward, turn right, turn left, rotate, and/or the like in one or more iterations according to increase in the RSSI of the intercepted wireless signals. The wireless unit may further apply trial and error strategy in the multiple iterations for operating the dynamic pool equipment unit until converging on the direction of the external station.

In each iteration the wireless unit may intercept wireless signals originating from the external station, estimate the direction of the external station based on the RSSI of the intercepted signals, and adjust the movement instruction transmitted to the dynamic pool equipment unit accordingly such that the dynamic pool equipment unit, and the wireless unit with it, may move towards the direction where the RSSI increases and thus gradually get closer to the external station.

According to some embodiments, the wireless unit may be independent of the dynamic pool equipment unit meaning that the wireless unit does not move with the dynamic pool equipment unit. The wireless unit may communicate with the dynamic pool equipment unit via one or more one or more communication channels. These communication channels may include one or more wired communication channels and/or wireless communication channels, specifically wireless communication channels which may efficiently travel through water, for example, an RF communication channel, a proprietary RF communication channel, Bluetooth, BLE, WLAN, and/or the like.

In such embodiments, the wireless unit may compute, and/or determine the location of the external station based on one or more locating attributes, for example, distance, direction, elevation, and/or the like computed, extracted, and/or derived based on analysis of Received Signal Strength Indicator (RSSI) of the intercepted wireless signals originating from the external station.

In another embodiment, the wireless unit is located on a pool equipment, whereas the wireless unit communicates with the external station when the pool equipment is partially not submerged, for example, when the dynamic pool equipment is a floating platform.

The wireless unit may communicate with the dynamic pool equipment unit via their connecting wired and/or wireless communication channel(s), designated first communication channel, while intercepting the wireless signals originating from the external station and received via a wireless communication channel, designated second wireless communication channel. For example, the first communication channel may comprise, for example, a wired serial channel, a wireless RF communication channel, optionally a proprietary RF channel which may efficiently travel through water for communicating with the dynamic pool equipment unit while it is submerged in the water of the water pool.

Optionally, assuming the first communication channel is wireless, the wireless unit may communicate with both the dynamic pool equipment unit and the external station via a common wireless communication channel.

The movement instructions transmitted by the wireless unit to the dynamic pool equipment unit may comprise for example, specific instructions for controlling movement of the dynamic pool equipment unit, for example, move forward, move backward, move upwards, move downwards, turn right, turn left, rotate, and/or the like. To this end the wireless unit must determine the location of the dynamic pool equipment unit which may be done using one or more methods and/or techniques. For example, the wireless unit may intercept wireless signals transmitted by the dynamic pool equipment unit and compute its location as done for the external station, based on analysis of the RSSI of the intercepted signals. In another example, the wireless unit may determine the location of the dynamic pool equipment unit based on location data received from the dynamic pool equipment unit, for example, geolocation data received from one or more location sensors, for example, a Global Positioning System (GPS) sensor coupled to the dynamic pool equipment unit.

In another example, the movement instructions transmitted by the wireless unit to the dynamic pool equipment unit may comprise an advance command and the location of the external station. Assuming the dynamic pool equipment unit is capable of determining its own location, the dynamic pool equipment unit may independently navigate itself to the location of the external station. The dynamic pool equipment unit may employ one or more methods, techniques and/or algorithms for determining its own location. For example, the dynamic pool equipment unit may determine its location based on geolocation data received from one or more geolocation sensors of the dynamic pool equipment unit, for example, a GPS sensor, and/or the like. In another example, the dynamic pool equipment unit may determine its location based on its location with respect to one or more features of the water pool computed based on sensory data received from one or more sensors of the dynamic pool equipment unit, for example, a compass, a pressure sensor, a visual sensor, and optical sensor, an accelerometer, a gyroscope, and/or the like.

Deploying a wireless unit for operating a dynamic pool equipment unit deployed in water pools to advance towards external stations and reach them may present significant benefits and advantages.

First, efficiently retrieving dynamic pool equipment units for one or more objectives, specifically maintenance operation(s), periodic inspection and/or the like such as, for example, docking, maintenance, charging, removal from service, and/or the like may significantly increase operation performance of the dynamic pool equipment units, for example, reliability, robustness, efficiency, longevity and/or the like.

Moreover, the dynamic pool equipment unit may typically lack wireless communication capabilities. Therefore using a wireless unit to relay the connectivity gap between the dynamic pool equipment unit and the external stations may resolve this limitation since the wireless unit may be adapted to communicate with the dynamic pool equipment unit via wired communication (routed through their connecting cable) on one hand and the wireless communication capabilities of the external stations on the other hand. This may therefore significantly increase connectivity compliance and connection performance, for example, reduce latency, increase communication range, and/or the like.

Even if one or more dynamic pool equipment units do support wireless communication connectivity, their wireless communication channels may be significantly limited as they may be adapted for underwater communication which may be very different from the communication technologies, channels and/or protocols used by the external stations which are typically oriented to common commercial communication. The wireless unit may therefore also resolve such a connectivity gap between the dynamic pool equipment units and the external stations by communicating with the dynamic pool equipment unit and the external station via different wireless networks supporting their individual communication capabilities.

Furthermore, the wireless unit may be implemented via one or more equipment units which are in common use in water pools and inherently comprise wireless communication capabilities to connect to both dynamic pool equipment units and to external stations. For example, floating buoys delivered by various pool equipment vendors inherently include wireless capabilities which support the commonly used wireless communication channels and protocols employed by the external devices and also support wireless connectivity to dynamic pool equipment units delivered by these vendors. Implementing the wireless unit by integrating the wireless unit's functionality in existing pool equipment may therefore using their inherent capabilities may therefore require no further hardware elements which may obviously reduce deployment, and/or maintenance complexity, effort, and/or cost.

In addition, a wireless unit which is physically attached to a dynamic pool equipment unit, via a cable and/or through direct coupling), and thus moves together with the dynamic pool equipment unit may consume significantly low energy since they may perform only a very simple RSSI analysis to detect a direction of advancement towards the external station which requires no computation, and may oriented comprise only a simple low-end, low power controller.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of operating a dynamic pool equipment to move towards an external station estimated based on analysis of intercepted wireless signals transmitted by the external station, according to some embodiments of the present invention.

An exemplary process 100 may be executed to navigate one or more dynamic pool equipment units located in a water pool and operate them to advance towards one or more external stations located outside the water pool.

In particular, a direction of the external station from the dynamic pool equipment unit may be estimated based on analysis of intercepted wireless signals which are transmitted by the external station, specifically based on a Received Signal Strength Indicator (RSSI) of the intercepted wireless signals.

Figure 2:
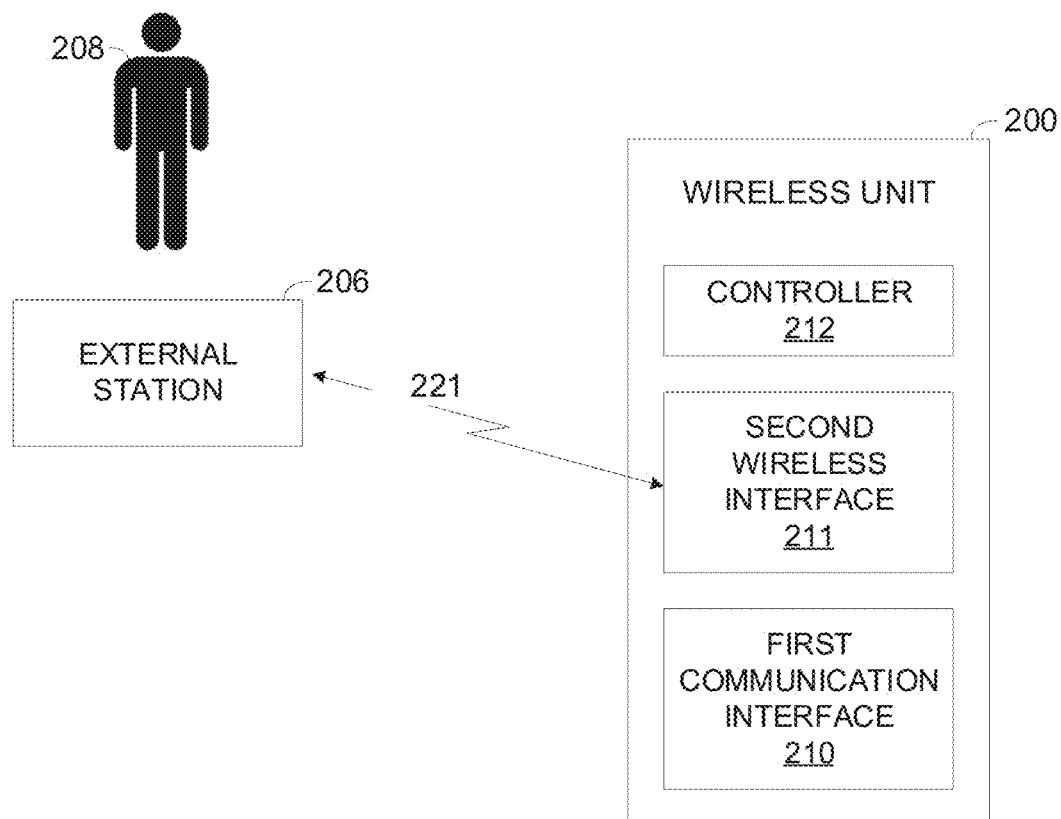
FIG. 2 is a schematic illustration of an exemplary system for operating a dynamic pool equipment unit to move towards an external station estimated based on analysis of intercepted wireless signals transmitted by the external station, according to some embodiments of the present invention.
Figure 2:
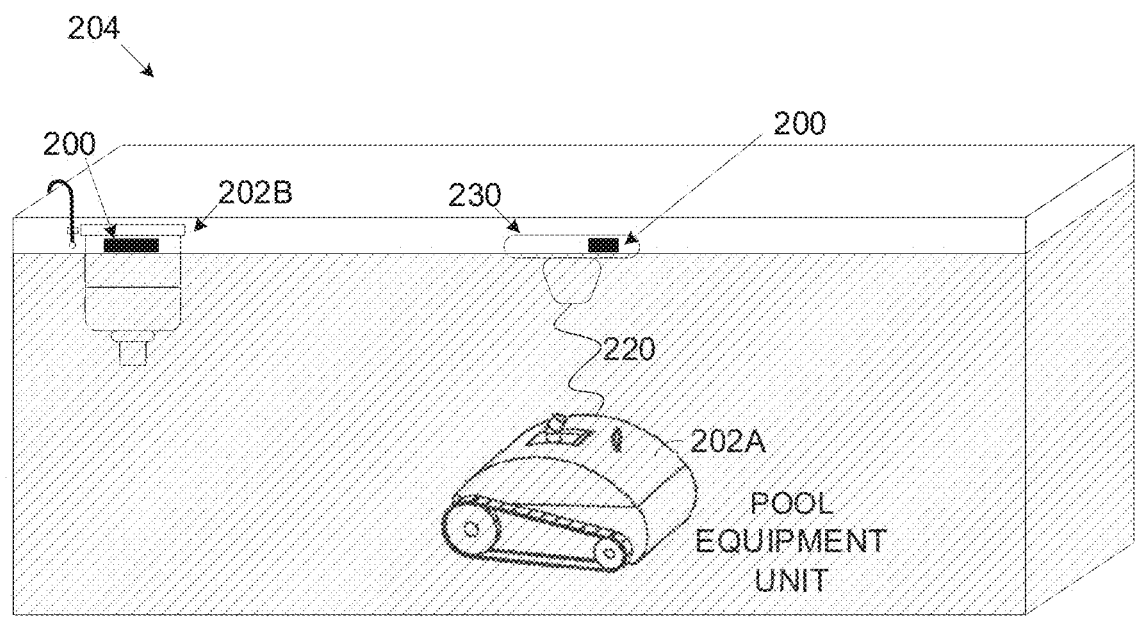

Reference is also made to FIG. 2, which is a schematic illustration of an exemplary system for operating a dynamic pool equipment to move towards an external station estimated based on analysis of intercepted wireless signals transmitted by the external station, according to some embodiments of the present invention.

An exemplary wireless unit 200 may be deployed to operate a dynamic pool equipment unit 202 to advance (move) towards one or more external stations 206 according to analysis of wireless signals transmitted by a target external station 206 and intercepted by the wireless unit 200.

The dynamic pool equipment unit 202, for example, a pool robot, a dynamic cleaning unit (e.g., skimmer, etc.), a pool maintenance robot, a water treatment system, and/or the like may be deployed in a body of water 204, specifically manmade (artificial) body of water rather such as, for example, a pool, a swimming pool, a water reservoir, a fountain, and/or the like designated water pool 204 herein after.

The external stations 206 located outside the water pool 204 may include, for example, a docking station, a maintenance station, a charging station, a master control unit, a user and/or the like. In another example, the external station 206 may comprise a client device associated with a user, for example, a mobile device such as, for example, a remote control, a phone, a Smartphone, a wearable device (e.g., Smart watch, etc.) held or worn by the user, a tablet, a laptop, a proprietary device, and/or the like that is associated with a user 208 who uses the client device for picking-up, retrieving, and/or physically accessing the dynamic pool equipment unit 202.

In particular, the wireless unit 200 may be physically connected, attached, mounted, and/or coupled to the dynamic pool equipment unit 202 such that the wireless unit 200 may move with the dynamic pool equipment unit 202 to the same direction as the dynamic pool equipment unit 202 moves.

However, while connected to the dynamic pool equipment unit 202, at least part of the wireless unit 200 is out of the water of the water pool 204. Specifically, one or more wireless signals reception elements, devices, and/or circuits of the wireless unit 200, for example, an antenna element may be out of the water.

For example, the wireless unit 200 may be physically connected, for example, coupled, mounted, integrated and/or the like to a floating buoy 230 which is connected to a dynamic pool equipment unit 202A, for example, a pool robot, and/or the like, via one or more cables such that while the dynamic pool equipment unit 202A may be fully submerged in the water pool 204, the floating wireless unit 200 may be at least partially out of the water.

In another example, the wireless unit 200 may be physically connected, i.e., mechanically coupled to one or more pool equipment units 202, for example, attached, directly connected, and/or integrated in the pool equipment unit 202. For example, the wireless unit 200 may be mechanically coupled to a dynamic pool equipment unit 202B, for example, a dynamic floating skimmer, and/or the like, which may not completely submerge in the water of the water pool 204 such that at least part of the wireless unit 200 is out of the water, specifically one or more of its wireless signals reception elements, devices, and/or circuits.

The wireless unit 200 may communicate with the dynamic pool equipment unit 202 via one or more one or more communication channels 220 as described herein after.

The wireless unit 200 may intercept wireless signals transmitted by the external station 206 in order to estimate, identify and/or otherwise determine a direction of the external station 206 and compute movement instructions accordingly for operating the dynamic pool equipment unit 202 to advance towards an external station 20.

The wireless unit 200 may include a first communication interface 210 for communicating with a dynamic pool equipment unit 202, a second wireless communication interface 211 for intercepting wireless signals transmitted by the external station 206, and a controller 212 for executing the process 100 to compute and transmit movement instructions to the dynamic pool equipment unit 202 for navigating it towards the external station 206.

The first communication interface 210 may include, for example, one or more communication interfaces for example, one or more wired communication channels 220. For example, assuming the wireless unit 200 is connected to the dynamic pool equipment unit 202 via cable(s), the wired communication channel(s) 220 may be routed through one or more of the cable(s) connecting the wireless unit 200 to the dynamic pool equipment unit 202, for example, the pool robot 202A. Such wired communication channels 220 may include, for example, a serial channel, a CAN bus channel, a proprietary communication channel, and/or the like. In another, assuming the wireless unit 200 is directly connected to the dynamic pool equipment unit 202, for example, the floating skimmer 202B, and/or the like, the wired communication channel(s) 220 may include one or more local communication channels connecting the wireless unit 200 to one or more local controllers of the directly connected dynamic pool equipment unit 202, for example, the floating skimmer 202B which control movement of the dynamic floating skimmer 202B. Such local communication channels may include, for example, a serial link, a discrete lines (e.g., GPIO, etc.), and/or the like. Moreover, assuming the wireless unit 200 is implemented in the same box, and/or printed circuit board (PCB) with the local controller(s), the local communication channels may include PCB level channels.

Optionally, the first communication interface 210 may include one or more wireless interfaces for connecting to one or more first wireless communication channels 220, for example, Bluetooth, BLE, WLAN (e.g. Wi-Fi), a proprietary RF communication channel and/or the like.

Via the first communication interface 210, the wireless unit 200 may communicate with the dynamic pool equipment unit 202 to transmit movement instructions for operating and/or navigating the dynamic pool equipment unit 202 to advance towards the external station 206.

The second wireless interface 211 may include one or more wireless interfaces for connecting to one or more second wireless communication channels 221, for example, Bluetooth, BLE, WLAN (e.g. Wi-Fi), and/or the like. Via the first wireless interface 211, the wireless unit 200 may intercept wireless signals transmitted via the second wireless communication channel(s) 221 by the external station(s) 206, specifically by a target external station 206 which is the current destination for the dynamic pool equipment unit 202. Optionally, the wireless unit 200 may also communicate with the external station 206 via one or more of the second wireless communication channel(s) 221 rather than just intercepting its transmitted wireless signals.

The term wireless communication channel as used throughout this disclosure is intended to encompass any wireless communication medium, protocol, and/or architecture such as, for example, networks, point-to-point connections, multi-drop connections and/or the like.

For brevity, the process 100 is presented and described for navigating a single dynamic pool equipment unit 202 to advance towards a single external station 206 located outside a single water pool 204. This, however, should not be construed as limiting since, as may become apparent to a person skilled in the art, the process 100 may be easily expanded and/or extended for navigating a plurality of dynamic pool equipment units 202 to advance towards one or more external stations 206 located outside a water pool 204.

Moreover, the process 100 may be duplicated for a plurality of water pools 204 for navigating one or more dynamic pool equipment units 202 to advance towards one or more external stations 206 located outside multiple water pools 204. Furthermore, the process 100 may be executed by one or more wireless units 200 deployed at a certain water pool for navigating one or more dynamic pool equipment units 202 to advance towards one or more external stations 206 located outside the certain water pool 204.

Furthermore, as described herein before, the process 100 may be executed by the controller 212 of the wireless unit 200. However, for brevity the process 100 is described herein as executed by the wireless unit 200 itself.

As shown at 102, the process 100 starts with the wireless unit 200 intercepting wireless signals transmitted by the external station 206 via one or more of the second wireless communication channels 221.

In particular, the wireless unit 200 may intercept the wireless signals originating from the external station 206 via the second wireless interface 211.

The external station 206 may comprise, for example, a user, a docking station, a charging station, a cleaning station, a maintenance station, a storage station, and/or the like at which the dynamic pool equipment unit 202 may dock, park, and/or connect for one or more uses, purposes, and/or applications. For example, an exemplary external station 206 may comprise a client device used by the user 208 to pick-up (collect, retrieve) the dynamic pool equipment unit 202. In another example, an exemplary external station 206 may comprise power means adapted for charging the dynamic pool equipment unit 202. In another example, an exemplary external station 206 may comprise an external storage station adapted, configured and/or shaped to include storage space for storing the dynamic pool equipment unit 202 while not in use. In another example, an exemplary external station 206 may comprise an external maintenance station comprising garbage collecting means adapted for offloading garbage, dirt, soil, leaves, and/or other residues collected by the dynamic pool equipment unit 202.

As shown at 104, the wireless unit 200 may measure the RSSI of the intercepted wireless signals.

As known in the art, in telecommunications, received signal strength indicator or Received Signal Strength Indication (RSSI) is a measurement of the power present in a received radio signal. The RSSI may be derived, for example, in the intermediate frequency (IF) stage before the IF amplifier. In another example, in zero-IF systems for example, the RSSI may be derived in the baseband signal chain, before the baseband amplifier. In another example, the RSSI may be sampled by an internal Analog to Digital Converter (ADC) of the receiver. The sampled RSSI output may be typically a Direct Current (DC) analog level.

The wireless unit 200, for example, the second wireless interface 211 may therefore include one or more provisions, for example, a circuit, a component, a module, a device, and/or the like adapted and/or configured to derive, sample, and/or otherwise extract the RSSI and output it, for example, to the controller 212. Such methods, techniques and provisions for measuring the RSSI of the intercepted wireless signals are known in the art and are out of scope of the present invention.

As shown at 106, the wireless unit 200 may estimate a direction of the external station 206 based on the strength, i.e., the RSSI of the intercepted wireless signals.

As shown at 108, the wireless unit 200 may compute and transmit movement instructions to the dynamic pool equipment unit 202 to instruct the dynamic pool equipment unit 202 to move (advance) towards the direction of the external station 206.

The wireless unit 200 may transmit the movement instructions movement instructions may include, for example, move forward, move backward, move upwards, move downwards, turn right, turn left, rotate, and/or the like via the first communication channel(s) 220.

As shown at 110, the process 100 may be iterative meaning the wireless unit 200 may branch back to 102 to initiate one or more additional iterations. In each iteration the wireless unit 200 may intercept wireless signals originating from the external station 206, estimate an updated direction of the external station 206 based on the RSSI measured for the intercepted signals, adjust the movement instructions accordingly, and transmit the adjusted movement instructions to the dynamic pool equipment unit 202. As such, the dynamic pool equipment unit 202, and the wireless unit 200 with it, may move towards the updated direction where the RSSI increases and thus gradually get closer to the external station 206.

As described herein before, strength of the intercepted signals, reflected by the RSSI, may increase as function of a distance of the wireless unit 200 to the external station 206. The RSSI (strength) of the intercepted signals may therefore increase when the wireless unit 200 is closer to the external station, and vice versa, the RSSI of the intercepted signals may decrease when the wireless unit 200 is further from the external station 206.

Moreover, the RSSI of the intercepted signals may increase when one or more antenna elements of the wireless unit 200 face the direction of the external station 206, specifically in case the antenna element(s) is directional. Complementary, the RSSI of the intercepted signals may decrease when the antenna element(s) of the wireless unit Since the it is physically connected to the dynamic pool equipment unit 202, the wireless unit 200 moves in the same direction as the dynamic pool equipment unit 202 and the position and/or location of the wireless unit 200 changes similarly to the location of the dynamic pool equipment unit 202.

The wireless unit 200 may therefore apply one or more iterative techniques, methods, and/or strategies for operating the dynamic pool equipment unit 202 to advance towards the external station 206 in a plurality of iterations according to an increase in the RSSI.

For example, the wireless unit 200 may apply trial and error strategy in the multiple iterations for operating the dynamic pool equipment unit 202 until converging on the direction of the external station 206. As such, in case the RSSI increases in a current iteration compared to a previous iteration in which the dynamic pool equipment unit 202 was instructed to move in a certain direction, the wireless unit 200 may estimate that the external station 206 is in the certain direction and may instruct the dynamic pool equipment unit 202 to further move in a certain direction. However, in case, the RSSI measured in the current iteration compared to the previous iteration, the wireless unit 200 may estimate that the external station 206 is not in the certain direction and may therefore instruct the dynamic pool equipment unit 202 to move in a different direction. The wireless unit 200 may repeat this iterative process until the dynamic pool equipment unit 202 converges on the direction of the external station 206 and moves toward it, optionally until reaching the external station 206.

Optionally, the wireless unit 200, specifically the controller 212 may be adapted to initiate the process 100 and transmit the movement instructions to the dynamic pool equipment unit 202 responsive to receiving a retrieve command from the external station 206. For example, the user 208 who wishes to pick-up (collect, retrieve) the dynamic pool equipment unit 202 may operate his client device 206 to transmit a retrieve command to the wireless unit 200. In another example, a charging station 206 may determine, based on a time since its last charging, that the dynamic pool equipment unit 202 needs to be recharged and may transmit a retrieve command to the wireless unit 200. In another example, a maintenance station 206 may determine, based on a time since a most recent maintenance session, that the dynamic pool equipment unit 202 needs to undergo one or more maintenance procedures.

In another example, the wireless unit 200 may be adapted to initiate the process 100 and transmit the movement instructions to the dynamic pool equipment unit 202 according to one or more predefined retrieval rules. For example, a certain retrieval rule may dictate that the wireless unit 200 should initiate the process 100 upon completion of operation of the dynamic pool equipment unit 202 in order to operate the dynamic pool equipment unit 202 to advance towards the external station 206, for example, a charging station where the dynamic pool equipment unit 202 may recharge. In another example, a certain retrieval rule may dictate that the wireless unit 200 should initiate the process 100 every predefined time period, for example, a day, a week, a month, and/or the like in order to operate the dynamic pool equipment unit 202 to advance towards the external station 206, for example, a maintenance station where the dynamic pool equipment unit 202 may undergo one or more maintenance procedures.

Optionally, rather than just estimating the direction of the external station 206 based on the RSSI, the wireless unit 200 may further compute, estimate, and/or determine a location of the external station 206 based on analysis of the RSSI as described herein after for the process 300. In such case, the wireless unit 200 may potentially identify the location of the external station with increased accuracy and may thus compute increased accuracy movement instructions which may expedite convergence of advancement of the dynamic pool equipment unit 202 towards the external station 206

According to some embodiments of the present disclosure, the wireless unit 200 may be independent of the dynamic pool equipment unit 202 meaning that the wireless unit 200 does not move with the dynamic pool equipment unit 202. In such embodiments, the wireless unit 200 may compute, and/or determine the location of the external station 206 based on one or more locating attributes, for example, distance, direction, elevation, and/or the like computed, extracted, and/or derived based on analysis of the RSSI measured for the intercepted wireless signals originating from the external station 206.

Figure 3:
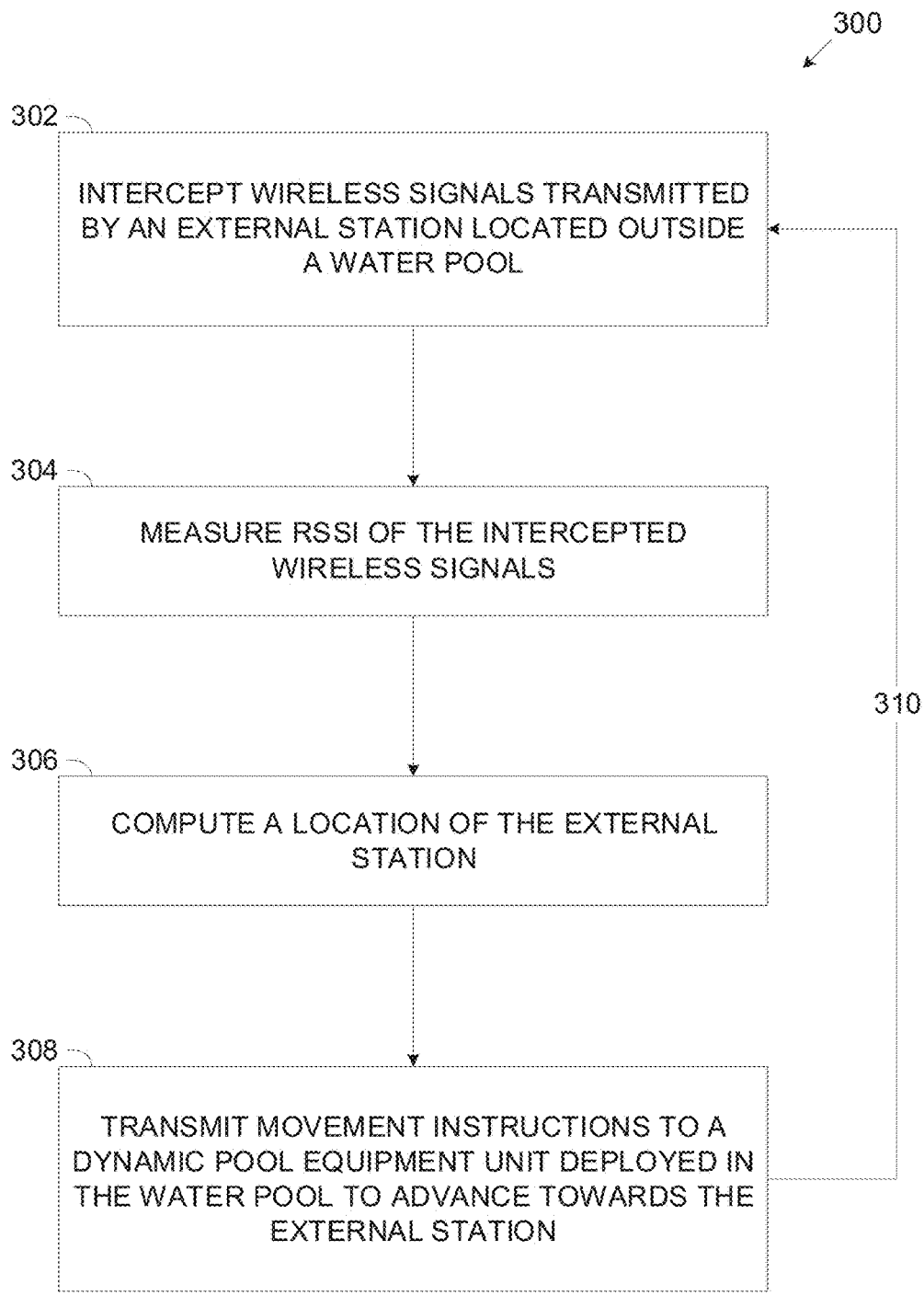
FIG. 3 is a flowchart of an exemplary process of operating a dynamic pool equipment unit to move to a location of an external station based on analysis of their intercepted wireless signals transmitted by the external station, according to some embodiments of the present invention.

Reference is now made to FIG. 3, which is a flowchart of an exemplary process of operating a dynamic pool equipment unit to move to a location of an external station based on analysis of their intercepted wireless signals transmitted by the external station, according to some embodiments of the present invention.

Figure 4:
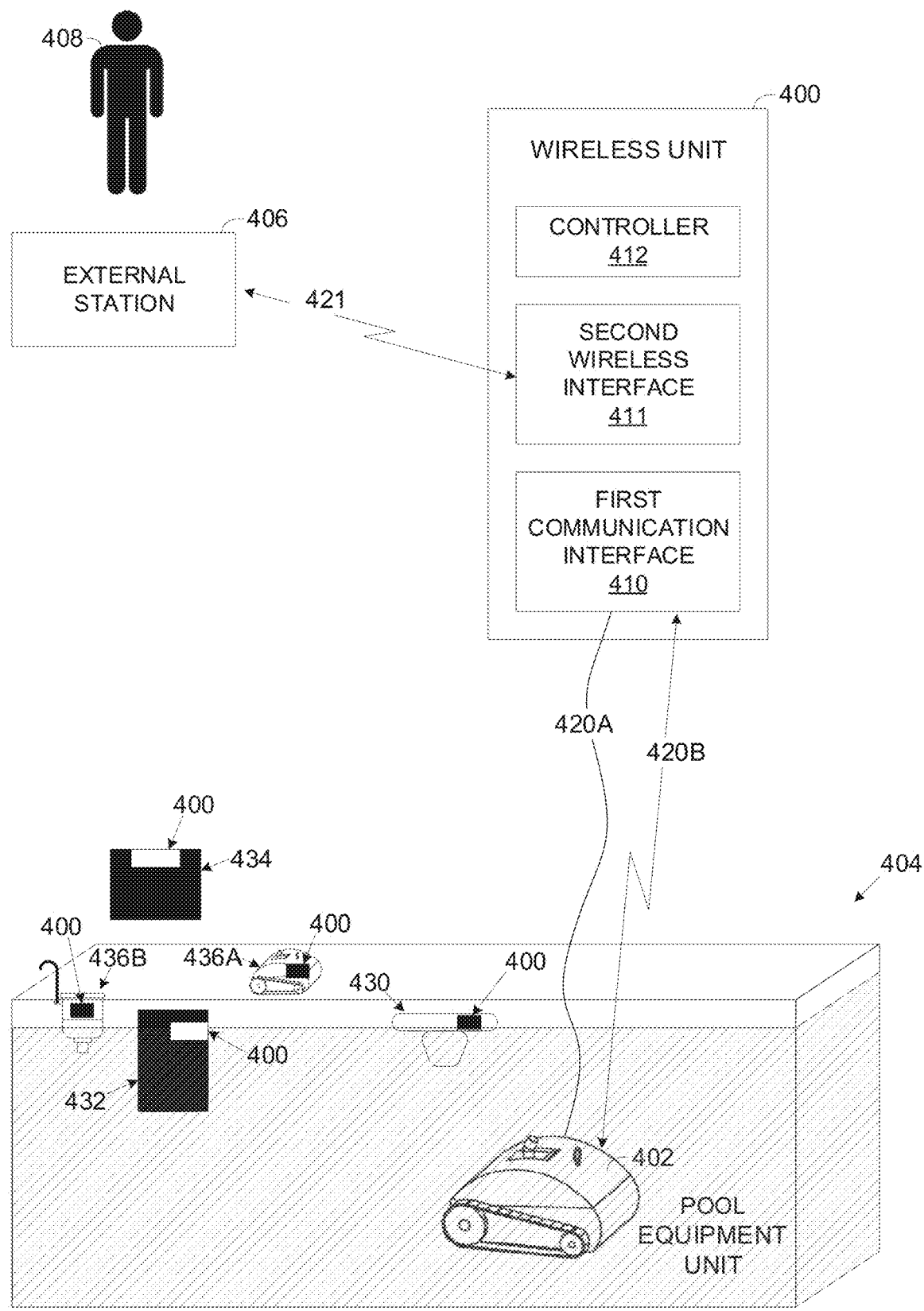
FIG. 4 is a schematic illustration of an exemplary system for operating a dynamic pool equipment unit to move to a location of an external station based on analysis of their intercepted wireless signals transmitted by the external station, according to some embodiments of the present invention.

Reference is also made to FIG. 4, which is a schematic illustration of an exemplary system for operating a dynamic pool equipment unit to move to a location of an external station based on analysis of their intercepted wireless signals transmitted by the external station, according to some embodiments of the present invention.

An exemplary process 300 for operating a dynamic pool equipment unit 402 such as the dynamic pool equipment unit 202, deployed in a water pool 404 such as the water pool 204, to advance towards one or more external stations 406 such as the external station 206 may be executed by a wireless unit 400 such as the wireless unit 200, specifically a wireless unit 400 which is independent of the dynamic pool equipment unit 402 and does not move with the dynamic pool equipment unit 402.

Optionally, while independent from the dynamic pool equipment unit 402 and not moving with it, the wireless unit 400 may be physically connected to the dynamic pool equipment unit 402 via one or more cables.

The wireless unit 400 may include a first communication interface 410 such as the first communication interface 210 for communicating with one or more dynamic pool equipment units 402, a second wireless interface 411 such as the second wireless interface 211 for intercepting wireless signals transmitted by one or more external stations 406, and a controller 412 such as the controller 212 for executing the process 300 to compute and transmit movement instructions to one or more dynamic pool equipment units 402 for operating and/or navigating them to advance (move) towards the external stations 406.

The first communication interface 410 may include one or more interfaces for connecting to one or more first communication channels 420 for communicating with the dynamic pool equipment unit(s) 402. The first communication channels 420 may include, for example, one or more wired communication channels 420A, for example, serial channel, CAN bus channel, and/or the like routed via a cable connecting the wireless unit 400 to one or more dynamic pool equipment units 402. In another example, the first communication interface 410 may include one or more wireless interfaces for connecting to one or more first wireless communication channels 420B, for example, an RF communication channel, a proprietary RF communication channel, Bluetooth, BLE, WLAN (e.g. Wi-Fi), and/or the like. In particular, the first wireless communication channels 420B may be such wireless channels which support efficient travel through water to enable reliable communication with the dynamic pool equipment units 402 while submerged in the water pool 404.

The second wireless interface 411 may include one or more wireless interfaces for connecting to one or more second wireless communication channels 421 such as the second wireless communication channels 221, for example, Bluetooth, BLE, WLAN (e.g. Wi-Fi), and/or the like. Via the second wireless interface 411, the wireless unit 400 may intercept wireless signals transmitted via the second wireless communication channel(s) 421 by the external station(s) 406. Optionally, the wireless unit 400 may also communicate with the external station 406 via the second wireless communication channel(s) 421 rather than just intercepting its transmitted wireless signals.

The term wireless communication channel as used throughout this disclosure is intended to encompass any wireless communication medium, protocol, and/or architecture such as, for example, networks, point-to-point connections, multi-drop connections and/or the like.

Optionally, in case the first communication interface 410 comprises one or more interfaces for connecting to the first wireless communication channel(s) 420B, the first communication channel(s) 420 and the second wireless communication channel(s) 421 may be utilized by a common wireless communication channel. Moreover, in such deployments of a common wireless communication channel, the first communication interface 410 and the second wireless interface 411 may be optionally utilized by a common wireless interface.

For example, the wireless unit 400 may communicate with one or more dynamic pool equipment units 402, and with one or more external stations 406 via a common BLE network. For example, the wireless unit 400 may be configured as master over the BLE network and each of the dynamic pool equipment unit(s) 402 and the external station (s) 406 may be configured as slaves. In such configuration, the master wireless unit 400 may communicate, via the BLE channel, with the slave dynamic pool equipment unit(s) 402 and further also intercept wireless signals transmitted by one or more of the slave external station(s) 406 via the BLE channel. Moreover, in such configuration, the wireless unit 400 may comprise a single wireless interface for connecting to the common BLE network.

In another example, the wireless unit 400, one or more dynamic pool equipment units 402, and one or more external stations 406 may all connect to a single WLAN (e.g., Wi-Fi) each assigned a unique identifier (ID), for example, a network address. In such case, the wireless unit 400 may communicate, via the WLAN, with the dynamic pool equipment unit(s) 402 using their unique IDs. The wireless unit 400 may also intercept wireless signals transmitted by each external station 406, via the WLAN, in particular wireless signals associated with network packets originating from the respective external station 406 and identified accordingly by the ID of the external station 406. Moreover, in such case, the wireless unit 400 may comprise a single wireless interface for connecting to the common WLAN.

As described for the controller 212, the controller 412 may include one or more controller, processors, microprocessors, micro-controllers, and/or the like, homogenous or heterogeneous, which may be optionally arranged for parallel processing, as clusters and/or as one or more multi core processor(s). The controller 412 may execute one or more software modules stored in a non-transitory medium (program store) available in the wireless unit 400, for example, a ROM, a Flash array, a hard drive, an SSD, a RAM device, a cache memory and/or the like. Additionally, and/or alternatively, the controller 412 may include, utilize and/or employ one or more hardware elements available in the wireless unit 400, for example, a circuit, a component, an IC, an ASIC, an FPGA, a DSP, and/or the like.

The controller 412 may therefore execute one or more functional modules utilized by one or more software modules, one or more of the hardware modules and/or a combination thereof. In particular, the controller 412 may execute one or more functional modules for executing the process 300 to operate and/or navigate one or more dynamic pool equipment units 402 to move (advance) towards one or more external stations 406.

The wireless unit 400 may be deployed in one or more deployment modes, arrangements and/or the like which may support underwater communication, optionally wireless communication, with one or more dynamic pool equipment units 402 deployed in the water pool 404 on one hand, and on the other hand be capable of intercepting wireless signals transmitted by the external station(s) 406.

In one exemplary deployment mode, the wireless unit 400 may be mechanically coupled, for example, mounted, integrated, attached, and/or the like to a floating unit (devices, objects, etc.) 430, for example, a buoy, a floating skimmer and/or the like adapted for floating on a water surface of the water pool 404. In particular, the wireless unit 400 may be mechanically coupled to the floating unit 430 such that at least part of its second wireless interface 411, for example, one or more antenna elements and/or part thereof, is out of water of the water pool 404.

Moreover, one or more of such floating units 430 which are already deployed and available in the water pool 404, for example, the buoy, the skimmer, and/or the like may include communication capabilities, at least for communicating with dynamic pool equipment units 402 and intercepting the wireless signals originating from external stations 406. Such existing floating units 430 can be therefore used to implement the wireless unit 400 using their inherent capabilities with no need for further hardware elements.

In another exemplary deployment mode, the wireless unit 400 may adapted for fixing in a static location in the water pool 404. For example, the wireless unit 400 may be fixed to the wall of the water pool 404 using one or more attachment means, for example, adhesive material, screws, locking element, and/or the like. In another example, the wireless unit 400 may be mechanically coupled, for example, mounted, integrated, attached, and/or the like to a fixed unit (devices, objects, etc.) 432 which is statically fixed on the wall of the water pool 404, for example, a skimmer, and/or the like. In particular, the wireless unit 400 may be fixed in its static location in the water pool 404 such that at least part of its second wireless interface 411, for example, one or more antenna elements and/or part thereof, is out of water of the water pool 404.

In another exemplary deployment mode, the wireless unit 400 may be adapted for fixing in a static location outside the water pool 404. For example, the wireless unit 400 may be deployed outside the water pool 404, typically in close proximity to the water pool 404, for example, laid on the ground next to the water pool 404, attached to an object (e.g., pole, structure, etc.) 434 next to the water pool 404, and/or the like.

In another exemplary deployment mode, the wireless unit 400 may be mechanically coupled to a dynamic unit 436 adapted for deployment in the water pool 404, for example, another dynamic pool equipment unit 436A such as the dynamic pool equipment unit 202, a moveable skimmer 436B which may automatically move and/or be manually moved to different locations in water pool 404, and/or the like. However, the dynamic unit 436 may be deployed, operated, and/or controlled such at least part of the second wireless interface 411, for example, one or more antenna elements and/or part thereof of the wireless unit 400, is out of water of the water pool 404.

For brevity, the process 300 is presented and described for navigating a single dynamic pool equipment unit 402 to advance towards a single external station 406 located outside a single water pool 404. This, however, should not be construed as limiting since, as may become apparent to a person skilled in the art, the process 300 may be easily expanded and/or extended for navigating a plurality of dynamic pool equipment units 402 to advance towards one or more external stations 406 located outside a water pool 404. Moreover, the process 300 may be duplicated for a plurality of water pools 404 for navigating one or more dynamic pool equipment units 402 to advance towards one or more external stations 406 located outside multiple water pools 404. Furthermore, the process 300 may be executed by one or more wireless units 400 deployed at a certain water pool 404 for navigating one or more dynamic pool equipment units 402 to advance towards one or more external stations 406 located outside the certain water pool 404.

As stated herein before, the process 300 may be executed by the controller 412 of the wireless unit 400. However, for brevity the process 300 is described herein as executed by the wireless unit 400 itself.

As shown at 302, the process 300 starts with the wireless unit 400 intercepting wireless signals transmitted by the external station 406 via one or more of the second wireless communication channels 421. In particular, the wireless unit

400 may intercept the wireless signals originating from the external station 406 via the second wireless interface 411.

As described herein before, the external station 406 may comprise, for example, a charging station, a cleaning station, a maintenance station, a storage station, and/or the like. In another example, the external station 406 may include an external storage station or storing the dynamic pool equipment unit 402 while not in use. In another example, the external station 406 may include garbage collecting means. In another example, the external station 406 may include an external client device used by a user 408 such as the user 208.

As shown at 304, the wireless unit 400 may measure the RSSI of the intercepted wireless signals.

As described herein before, the RSSI may be measured, extracted, derived and/or the like by one or more circuits, components, devices, and/or elements of the wireless unit 400, for example, an IF stage of a wireless receiver, a baseband signal chain, an ADC, and/or the like.

The wireless unit 400, specifically the second wireless interface 411 may therefore include one or more provisions, for example, a circuit, a component, a module, a device, and/or the like adapted and/or configured to measure, derive, sample, and/or otherwise extract the RSSI and output it, for example, to the controller 112. Such methods, techniques and provisions for measuring the RSSI of the intercepted wireless signals are known in the art and are out of scope of the present invention.

As shown at 306, the wireless unit 400 may compute a location of the external station 406 based on analysis of the RSSI of the intercepted wireless signals.

Specifically, the wireless unit 400 may compute the location of the external station 406 based on one or more location attributes of the external station 406 computed based on the measured RSSI of the intercepted wireless signals, for example, a distance between the wireless unit 400 and the external station 406, a direction, i.e., an Angle of Arrival (AOA) of the intercepted wireless signals, an elevation of the external station 406 with respect to the wireless unit 400, and/or the like.

The wireless unit 400 may apply one or more methods, as known in the art, for computing the location attributes of the external device 406 according to the measured RSSI.

For example, the wireless unit 400 may apply and/or use one or more formulations and/or equations as known in the art for computing the distance to the external station 406. One exemplary formulation is presented in equation 1 below.

$$\text{Distance} = 10^{\frac{(\text{Measured Power} - \text{Instant RSSI})}{10 \cdot N}} \quad \text{Equation 1}$$

Where N is a constant depending on environmental factor, N may be in a range of 2 to 4.

In another example, the wireless unit 400 may compute the AOA of the intercepted wireless signals and thus the direction of the external station 406 based on the RSSI measured for wireless signals intercepted by each of multiple antenna elements of the wireless unit 400, for example, an omnidirectional antenna, a directional antenna, and/or the like connecting to the second wireless interface 411.

However, details of methods, techniques, algorithms, formulations, and/or means for computing the location attributes of the external station 406 based on the measured RSSI and computing the location of the external station 406 accordingly is known in the art and is out of scope of the present invention.

As shown at 308, the wireless unit 400 may transmit movement instructions to the dynamic pool equipment unit 402, via the communication channel 420, to instruct the dynamic pool equipment unit 402 to move towards the location of the external station 406 possibly in attempt to reach it.

For example, the movement instructions transmitted by the wireless unit 400 to the dynamic pool equipment unit 402 may enable the dynamic pool equipment unit 402 to advance towards the user 408 with no further external intervention. For example, the movement instructions may include a "GO" instruction instructing the dynamic pool equipment unit 402 to advance towards the location of the external station 406. The movement instructions may also include the location of the computed location of the external station 406, for example, geolocation coordinates.

The dynamic pool equipment unit may employ one or more methods, techniques and/or algorithms for determining its own location. For example, the dynamic pool equipment unit 402 may derive its own geolocation typically based on geolocation data received from one or more geolocation sensors mechanically coupled to the dynamic pool equipment unit 402 (e.g., integrated, embedded, attached, mounted, etc.), for example, a Global Positioning System (GPS) sensor, and/or the like. Based on its own geolocation, the dynamic pool equipment unit 402 may navigate itself to advance towards the geolocation of the external station 406 as was received from the wireless unit 400.

The dynamic pool equipment unit may employ one or more methods, techniques and/or algorithms for determining its own location. For example, the dynamic pool equipment unit may determine its location based on geolocation data received from one or more geolocation sensors of the dynamic pool equipment unit, for example, a GPS sensor, and/or the like. In another example, the dynamic pool equipment unit 202 may determine its location based on its location with respect to one or more features of the water pool 204 computed based on sensory data received from one or more sensors of the dynamic pool equipment unit, for example, a compass, a pressure sensor, a visual sensor, and optical sensor, an accelerometer, a gyroscope, and/or the like. The features of the water pool 204, for example, a wall, a surface, a corner, a pool edge, and/or the like may be mapped in map data relating to the water pool 204 which may be generated by the dynamic pool equipment unit 202 and/or obtained from one or more map data records generated for the water pool 204.

In another example, the movement instructions transmitted by the wireless unit 400 to the dynamic pool equipment unit 402 may include actual movement directions, i.e., turn right, turn left, move forward, move backward, move up, move down, rotate, and/or the like, computed by the wireless unit 400 for operating the dynamic pool equipment unit 402 to advance towards the external station 406. In particular, the wireless unit 400 may compute these movement instructions according to a location of the dynamic pool equipment unit 402 with respect to the location of the external station 406.

The wireless unit 400 may be adapted to apply one or more methods, techniques, and/or algorithms for computing the location of the dynamic pool equipment unit 402. For example, the wireless unit 400 may communicate with the dynamic pool equipment unit 402, via the first communication channel 420 to receive location data, for example, geolocation data received from one or more geolocation sensors which are mechanically coupled to the dynamic pool equipment unit 402, for example, a GPS sensor, and/or the like.

In another example, the wireless unit 400 may compute the location of the dynamic pool equipment unit 402 based on analyses of wireless signals transmitted by the dynamic pool equipment unit 402 via the first wireless communication channel(s) 420B, if available, and intercepted via the first communication interface 410. In particular, the wireless unit 400 may execute a process similar to the process 300, specifically steps 302-306 of the process 300 to compute the location of the dynamic pool equipment unit 402 based on analyses of the RSSI of the wireless signals originating from the dynamic pool equipment unit 402 and intercepted via the first communication interface 410.

However, in case the wireless unit 400 computes the location of the dynamic pool equipment unit 402 based on the RSSI of wireless signals transmitted by the dynamic pool equipment unit 402, the wireless unit 400 may apply adjusted formulations for computing the location of the dynamic pool equipment unit 402 based on analysis of the RSSI of its intercepted wireless signals. For example, while the dynamic pool equipment unit 402 is submerged in the water of the water pool 404, the wireless unit 400 may adapt the computation for the underwater medium through which the wireless signals of the first wireless communication channel(s) 420B advance. For example, the wireless unit 400 may use a different environment factor adapted and/or selected for the water medium which may have one or more different wave transmission characteristics, parameters, and/or attributes which may affect wireless signal advancement compared to the air medium. Since the wireless signals transmitted from the dynamic pool equipment unit 402 via the first wireless communication channel(s) 420B may advance through the water medium and/or the air medium, the wireless unit 400 may apply a different environment factor compared to the environment factor used in step 306 for the wireless signals transmitted via the second wireless communication channel(s) 420B which goes only through the air medium between the external station 406 and the wireless unit 400.

As shown at 310, the process 300 may be iterative meaning the wireless unit 400 may branch back to 302 to initiate one or more additional iterations for intercepting wireless signals transmitted by the external station, computing its location and transmitting movement instructions to the dynamic pool equipment unit 402.

For example, the wireless unit 400 may be adapted to dynamically adjust the movement instructions transmitted to the dynamic pool equipment unit 402 responsive to one or more changes in the location of the external station 406. The wireless unit 400 may continuously and/or periodically initiate one or more iterations 310 to intercept and analyze wireless signals transmitted by the external station 406, compute its updated location and transmit adjusted movement instructions to the dynamic pool equipment unit 402 accordingly.

For example, assuming the external station 406 comprises the client device used by the user 408. In such case, the user 408 carrying (holding) the client device 406 may move and change its location. In such case, the unit 400 may initiate one or more iterations 310 to intercept and analyze wireless signals transmitted by the client device 406 to compute the updated location of the user 408 and transmit adjusted movement instructions to the dynamic pool equipment unit 402 to advance towards the updated location.

In another example, the wireless unit 400 may be adapted to identify deviation of the dynamic pool equipment unit 402 from a direction instructed by the wireless unit 400. In such case, the wireless unit 400 may detect the deviation and may transmit adjusted movement instructions to the dynamic pool equipment unit 402 accordingly to move from its deviated location towards the location of the external station 406.

Optionally, as described for the process 100, the wireless unit 400, specifically the controller 412 may be adapted to initiate the process 300 and transmit the movement instructions to the dynamic pool equipment unit 402 responsive to receiving a retrieve command from the external station 406.

Moreover, the wireless unit 400 may be optionally adapted to initiate the process 300 and transmit the movement instructions to the dynamic pool equipment unit 402 according to one or more predefined retrieval rules as described for the process 100.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms pool equipment unit, RSSI measurement and derivation, and RSSI based location computation are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for navigating a dynamic pool equipment unit, comprising:
   a wireless unit coupled to a dynamic pool equipment unit deployed in a water pool such that the wireless unit moves with the dynamic pool equipment unit while at least partially out of the water, the wireless unit comprising:
      a first interface for communicating with the dynamic pool equipment unit via a first communication channel;
      a second interface for intercepting wireless signals transmitted by at least one external station via a wireless communication channel; and
      a controller adapted for navigating the dynamic pool equipment unit to advance towards the at least one external station by iteratively:
         measuring received signal strength indicator (RSSI) of wireless signals transmitted by the at least one external station via the wireless communication channel and intercepted via the first interface,
         estimating a direction from the dynamic pool equipment to the at least one external station based on analysis of the RSSI and identifying a direction along which measured RSSI is increased between iterations, and
         transmitting movement instructions to the dynamic pool equipment unit to move in a direction according to the estimated direction to the at least one external station.

2. The system of claim 1, wherein the controller is adapted to estimate the direction of the at least one external station based on a power of the intercepted signals extracted from the RSSI.

3. The system of claim 1, wherein the controller is further adapted to navigate the dynamic pool equipment unit to advance towards the at least one external station in a plurality of iterations, each iteration comprising:
   measuring the RSSI of wireless signals transmitted by the at least one external station,
   estimating an updated direction of the at least one external station based on analysis of the RSSI, and
   transmitting adjusted movement instructions to the dynamic pool equipment unit to advance towards the updated direction of the at least one external station.

4. The system of claim 1, wherein the controller is adapted to transmit the movement instructions to the dynamic pool equipment unit responsive to at least one of:
   receiving a retrieve command from the at least one external station, and
   according to at least one predefined retrieval rule.

5. The system of claim 1, wherein the wireless communication channel comprises at least one of: a Bluetooth based channel, a wireless local area network channel, and a radio frequency channel.

6. The system of claim 1, wherein at least part of the second interface is out of water of the water pool.

7. The system of claim 1, wherein the wireless unit is directly connected to the dynamic pool equipment unit.

8. The system of claim 1, wherein the wireless unit is connected to the dynamic pool equipment unit via at least one cable.

9. The system of claim 1, wherein the at least one external station is a member of a group comprising: a client device associated with a user, a maintenance station, a charging station, and a master control unit.

10. A method of navigating a dynamic pool equipment unit, comprising:
    using a controller of a wireless unit coupled to a dynamic pool equipment unit deployed in a water pool such that the wireless unit moves with the dynamic pool equipment unit while at least partially out of the water, for:
       navigating the dynamic pool equipment unit to advance towards at least one external station by iteratively:
          measuring received signal strength indicator (RSSI) of wireless signals transmitted by the at least one external station via the wireless communication channel and intercepted via a wireless communication channel,
          estimating a direction from the dynamic pool equipment to the at least one external station based on analysis of the RSSI and identifying a direction along which measured RSSI is increased between iterations, and transmitting movement instructions to the dynamic pool equipment unit, via a first communication channel, to move in a direction according the estimated direction to the at least one external station.

11. A method of navigating a dynamic pool equipment unit, comprising:
using a controller of a wireless unit adapted to communicate with at least one dynamic pool equipment unit deployed in a water pool, for:
measuring received signal strength indicator (RSSI) of wireless signals transmitted by at least one external station via a second wireless communication channel;
computing a location of the at least one external station based on analysis of the RSSI; and
transmitting to the at least one dynamic pool equipment unit, via a first communication channel, movement instructions to move in a direction towards the computed location of the at least one external station.

12. The method of claim 11, wherein the controller is adapted to compute the location of the at least one external station based on at least one location attribute of the at least one external station computed based on the measured RSSI, the at least one location attribute is a member of a group comprising: a distance, a direction, and an elevation.

13. The method of claim 11, wherein the controller is further adapted to dynamically adjust the movement instructions responsive to a change in the location of the at least one external station.

14. The method of claim 11, wherein the movement instructions comprise the location of the at least one external station to enable the at least one dynamic pool equipment unit to advance towards the at least one external station.

15. The method of claim 11, wherein the movement instructions comprise instructions for operating the at least one dynamic pool equipment unit to move according to a location of the at least one dynamic pool equipment unit with respect to the location of the at least one external station.

16. The method of claim 15, wherein the controller is adapted to compute the location of the at least one dynamic pool equipment unit based on location data received from at least one location sensor mechanically coupled to the at least one dynamic pool equipment unit.

17. The method of claim 11, wherein the first communication channel comprises at least one of: a wired communication channel, and a first wireless communication channel.

18. The method of claim 17, wherein the controller is adapted to compute a location of the at least one dynamic pool equipment unit based on analyses of wireless signals transmitted by the at least one dynamic pool equipment unit via the first wireless communication channel.

19. The method of claim 17, wherein the first wireless communication channel and the second wireless communication channel are utilized by a single common wireless communication channel.

20. The method of claim 11, wherein the wireless unit is adapted for deployment in at least one of a plurality of deployment modes comprising:
mechanical coupling to a buoy adapted for floating on a water surface of the water pool such that at least part of the wireless unit is out of water of the water pool,
fixing in a static location in the water pool such that at least part of the wireless unit is out of water of the water pool,
fixing in a static location outside the water pool, and
mechanical coupling to another dynamic unit adapted for deployment in the water pool such that at least part of the wireless unit is out of water of the water pool.

* * * * *